US005666371A

United States Patent [19]
Purdham

[11] Patent Number: 5,666,371
[45] Date of Patent: Sep. 9, 1997

[54] METHOD AND APPARATUS FOR DETECTING ERRORS IN A SYSTEM THAT EMPLOYS MULTI-BIT WIDE MEMORY ELEMENTS

[75] Inventor: David M. Purdham, Brooklyn Park, Minn.

[73] Assignee: Unisys Corporation, Blue Bell, Pa.

[21] Appl. No.: 394,384

[22] Filed: Feb. 24, 1995

[51] Int. Cl.⁶ .................................................. G06F 11/10
[52] U.S. Cl. .................................................. 371/40.11
[58] Field of Search ............................... 371/37.1, 37.6, 371/40.1, 40.2, 40.4

[56] References Cited

U.S. PATENT DOCUMENTS

| | | | |
|---|---|---|---|
| 3,567,916 | 3/1971 | Fullton, Jr. | 235/153 |
| 3,761,695 | 9/1973 | Eichelberger | 235/153 |
| 3,887,901 | 6/1975 | Moore, III | 340/146.1 |
| 3,911,261 | 10/1975 | Taylor | 235/153 |
| 3,961,747 | 6/1976 | Small et al. | 235/61.9 R |
| 3,982,111 | 9/1976 | Lerner et al. | 235/153 |
| 4,016,409 | 4/1977 | Kim | 235/153 |
| 4,058,851 | 11/1977 | Scheuneman | 364/900 |
| 4,074,229 | 2/1978 | Prey | 340/146.1 |
| 4,092,713 | 5/1978 | Scheuneman | 364/200 |
| 4,112,502 | 9/1978 | Scheuneman | 364/200 |
| 4,139,148 | 2/1979 | Scheuneman et al. | 235/312 |
| 4,163,147 | 7/1979 | Scheuneman et al. | 235/312 |
| 4,195,770 | 4/1980 | Benton et al. | 371/21 |
| 4,225,958 | 9/1980 | Funatsu | 371/15 |
| 4,298,980 | 11/1981 | Hajdu et al. | 371/25 |
| 4,308,616 | 12/1981 | Timoc | 371/23 |
| 4,369,511 | 1/1983 | Kimura et al. | 371/21 |
| 4,370,746 | 1/1983 | Jones et al. | 371/27 |

(List continued on next page.)

OTHER PUBLICATIONS

IBM Technical Disclosure Bulletin, vol. 18, No. 5, Oct. 1975, pp. 1415–1416.

IBM Technical Disclosure Bulletin, vol. 25, No. 10, Mar. 1983, pp. 5196–5198.

Electronics, "Level–Sensitive Scan Design Test Chips, Boards, Systems," Neil C. Berglund, vol. 52, No. 6, Mar. 15, 1979, pp. 108–110.

Clinton Kuo et al., Soft–Defect Detection (SDD) Technique for a High–Reliability CMOS SRAM, IEEE Journal of Solid-State Circuits, vol. 25, No. 1, Feb., 1990.

"A Defect of Fault Tolerant Design of WSI Static RAM Modules", Tsuda, 1990, IEEE, pp. 213–219.

"A Built-In Hamming Code ECC Circuit for DRAM's", Forutani et al., IEEE Journal, vol. 24, No. 1, Feb., 1989.

"A Class of Odd–Weight–Column SEC–DED–SbED Codes for Memory System Application", Shigeo Kaneda, IEEE Transactions on Computers, vol. c–33, No. 8, Aug. 1984.

"Error–Correcting Codes with Byte Error–Detection Capability", Chin–Long Chen, IEEE Transactions on Computers, vol. c–32, No. 7, Jul. 1983.

Primary Examiner—Stephen M. Baker
Attorney, Agent, or Firm—Nawrocki, Rooney & Sivertson, P.A.

[57] ABSTRACT

An apparatus for and method of detecting errors in a system which employs multi-bit wide memory elements. The error correction code (ECC) of the present invention is odd weighted and thus has an odd number of check bits. Further, the exemplary ECC has a single code in each of the check bit columns. The error correction code of the present invention may detect byte errors thereby providing a mechanism for detecting errors within system which employs multiple bit wide memory elements. The data word in an exemplary embodiment may comprise 44 bits including 36 data bits, one IF bit, and seven check bits. The 44 bit data word may comprise eleven (11) four bit bytes wherein each of the eleven (11) four bit bytes of the 44 bit data word are stored in a different memory element. Each of the 44 bits of the data word are stored in an appropriate one of the eleven (11) memory elements to maximize the error detection capability of the exemplary error correction code. The exemplary ECC may: detect and correct all single bit errors in the 44 bit data word; detect all two bit errors in the 44 bit data word; detect all three bit errors in each of the eleven (11) four bit bytes of the 44 bit data word; and detect all four bit errors in each of the eleven (11) four bit bytes of the 44 bit data word.

17 Claims, 8 Drawing Sheets

U.S. PATENT DOCUMENTS

| Patent # | Date | Inventor | Class |
|---|---|---|---|
| 4,433,413 | 2/1984 | Fasang | 371/25 |
| 4,476,431 | 10/1984 | Blum | 324/73 R |
| 4,493,077 | 1/1985 | Agrawal et al. | 381/25 |
| 4,513,283 | 4/1985 | Leininger | 340/825.02 |
| 4,531,213 | 7/1985 | Scheuneman | 371/3 |
| 4,534,028 | 8/1985 | Trischler | 371/25 |
| 4,535,467 | 8/1985 | Davis et al. | 377/81 |
| 4,546,272 | 10/1985 | Suzuki et al. | 307/455 |
| 4,556,974 | 12/1985 | Kozlik | 370/89 |
| 4,566,104 | 1/1986 | Bradshaw et al. | 371/15 |
| 4,580,066 | 4/1986 | Berndt | 307/276 |
| 4,608,683 | 8/1986 | Shigaki | 370/13 |
| 4,628,217 | 12/1986 | Berndt | 307/467 |
| 4,649,475 | 3/1987 | Scheuneman | 364/200 |
| 4,670,876 | 6/1987 | Kirk | 371/3 |
| 4,688,219 | 8/1987 | Takemae | 371/10 |
| 4,701,920 | 10/1987 | Resnick et al. | 371/25 |
| 4,757,440 | 7/1988 | Scheuneman | 364/200 |
| 4,768,193 | 8/1988 | Takemae | 371/10 |
| 4,782,487 | 11/1988 | Smelser | 371/21 |
| 4,783,785 | 11/1988 | Hanta | 371/25 |
| 4,788,684 | 11/1988 | Kawaguchi et al. | 371/21 |
| 4,835,774 | 5/1989 | Ooshima et al. | 371/25 |
| 4,847,519 | 7/1989 | Wahl et al. | 307/296.2 |
| 4,876,685 | 10/1989 | Rich | 371/21.6 |
| 4,888,772 | 12/1989 | Tanigawa | 371/21.2 |
| 4,896,323 | 1/1990 | Korner et al. | 371/61 |
| 4,903,266 | 2/1990 | Hack | 371/21.2 |
| 4,918,695 | 4/1990 | Scheuneman et al. | 371/51.1 |
| 4,918,696 | 4/1990 | Purdham et al. | 371/57.1 |
| 4,926,426 | 5/1990 | Scheuneman et al. | 371/40.1 |
| 4,962,501 | 10/1990 | Byers et al. | 371/51.1 |
| 4,969,148 | 11/1990 | Nadeau-Dostie et al. | 371/21.1 |
| 4,996,688 | 2/1991 | Byers et al. | 371/16.5 |
| 5,003,542 | 3/1991 | Mashiko et al. | 371/40.1 |
| 5,107,501 | 4/1992 | Zorian | 371/213 |
| 5,138,619 | 8/1992 | Fasang et al. | 371/21.1 |
| 5,140,597 | 8/1992 | Araki | 371/51.1 |
| 5,140,685 | 8/1992 | Sipple et al. | 395/425 |
| 5,155,735 | 10/1992 | Nash et al. | 371/49.1 |
| 5,157,781 | 10/1992 | Harwood et al. | 395/575 |
| 5,173,906 | 12/1992 | Dreibelbis et al. | 371/22.5 |
| 5,222,066 | 6/1993 | Grula et al. | 371/21.1 |
| 5,224,101 | 6/1993 | Popyack, Jr. | 371/21.1 |
| 5,228,132 | 7/1993 | Neal et al. | 395/425 |
| 5,241,547 | 8/1993 | Kim | 371/60 |
| 5,299,313 | 3/1994 | Petersen et al. | 395/200 |

FIG. 6

METHOD AND APPARATUS FOR DETECTING ERRORS IN A SYSTEM THAT EMPLOYS MULTI-BIT WIDE MEMORY ELEMENTS

CROSS REFERENCE TO CO-PENDING APPLICATIONS

The present application is related to U.S. patent application Ser. No. 08/233,811, filed Apr. 26, 1994, entitled "Multiple Memory Bit/chip Failure Detection", and U.S. patent application Ser. No. 08/225,891, filed Apr. 11, 1994, filed, entitled "Control Store Built-In-Self-Test", and U.S. patent application Ser. No. 07/978,093, filed Nov. 17, 1992, entitled "Continuous Embedded Parity Checking for Error Detection in Memory Structures", and U.S. patent application Ser. No. 08/173,408, filed Dec. 23, 1993, entitled "Micro Engine Dialogue Interface", all assigned to the assignee of the present invention and all incorporated herein by reference.

BACKGROUND OF THE INVENTION

1. Field of the Invention

The present invention is generally related to general purpose, stored program, digital computers which employ multi-bit wide memory elements and more particularly relates to efficient means for performing error detection and correction thereon.

2. Description of the Prior Art

A key design element of high reliability computer systems is that of error detection and correction. It has long been recognized that the integrity of the data bits within the computer system is critical to ensure the accuracy of operations performed in the data processing system. The alteration of one data bit in a data word can dramatically affect arithmetic calculations or can change the meaning of a data word as interpreted by other sub-systems within the computer system. Often the cause of an altered data bit is traced to a faulty memory element within the computer system and therefore it is critical that error detection be performed on the memory elements.

One method for performing error detection on the memory elements is to associate an additional bit, called a "parity bit", along with the binary bits comprising an addressable word. This method involves summing without carry the bits representing a "one" within a data word and providing an additional "parity bit" so that the total number of "ones" across the data word including the added parity bit is either odd or even. The term "Even Parity" refers to a parity mechanism which provides an even number of ones across the data word including the parity bit. Similarly, the term "Odd Parity" refers to a parity mechanism which provides an odd number of ones across the data word including the parity bit.

A typical system which uses parity as an error detection mechanism has a parity generation circuit for generating the parity bit. When the system stores a data word into memory, the parity generation circuit generates a parity bit from the data word and the system stores both the data word and the corresponding parity bit into an address location in a memory. When the system reads the address location where the data word is stored, both the data word and the corresponding parity bit are read from the memory. The parity generation circuit then regenerates the parity bit from the data bits read from the memory device and compares the regenerated parity bit with the parity bit that is stored in memory. If the regenerated parity bit and the original parity bit do not compare, an error is detected and the system is notified.

It is readily known that a single parity bit in conjunction with a multiple bit data word can detect a single bit error within the data word. However, it is also readily known that a single parity bit in conjunction with a multiple bit data word can be defeated by multiple errors within the data word. As calculation rates increase, circuit sizes decrease, and voltage levels of internal signals decrease, the likelihood of a multiple errors within a data word increase. Therefore, methods to detect multiple errors within a data word are essential.

System designers have developed methods for detecting multiple errors within multiple bit data words by providing multiple parity bits for each multiple bit data word. Although this technique has been successfully used, it significantly increases the overhead required to perform error detection because the parity generation circuit is more complex and the additional parity bits must be stored along with each data word. It can readily be seen that each additional parity bit that is included within a system adds a significant amount of overhead to the system.

Parity generation techniques are also used to perform error correction within a data word. Error correction is typically performed by encoding the data word to provide error correction code bits that are stored along with the bits of the data word. Upon readout, the data bits read from the addressable memory location are again subject to the generation of the same error correction code signal pattern. The newly generated pattern is compared to the error correction code signals stored in memory. If a difference is detected, it is determined that the data word is erroneous. Depending on the encoding system utilized it is possible to identify and correct the bit position in the data word indicated as being incorrect. The system overhead for the utilization of error correction code signals is substantial. The overhead includes the time necessary to generate the error correction codes, the memory cells necessary to store the error correction codes for each corresponding data word, and the time required to perform the decode when the data word is read from memory. These represent disadvantages to the error correction code system.

As can be seen from the previous discussion, a single parity bit system which stores the parity bit along with the data word requires the least amount of overhead within the system. The disadvantage of a single parity bit system is that only single bit failures can be detected. In prior art systems, a parity bit is typically provided for each data word that is stored within a memory device. Furthermore, the parity bit and the corresponding data word are typically stored at the same address location within the memory device. This is true even if there are multiple memory devices within the computer system. That is, each memory unit is treated independent from the others and therefore each memory unit stores both data words and the corresponding parity bits. Typically, there are three types of errors that occur within a memory device. The first type of error is an error in any single bit within the memory device. These errors will be detected by a single parity bit being stored along with the corresponding data word as discussed above. The second type of error is an error in multiple bits in a memory device. For example, if bit 0 and bit 1 both failed, they may cancel each other out when it comes to computing the parity bit, and the error may go undetected. This type of error may be detected by multiple bit error detection schemes. Finally, the entire memory device may fail causing potential errors in all of the bits of the memory device. The last two types of errors are especially costly because a substantial amount of overhead must be provided to detect multiple bit errors. As stated above, detecting multiple bit errors significantly increases the overhead required to perform error detection because the parity generation circuit is more complex and additional parity bits must be stored along with each data word. It can readily be seen that each additional parity bit that is included within a system adds a significant amount of overhead to the system.

Although the above discussion provides a good overview of error detection and correction techniques for systems that store a data word in a single memory device, further techniques have been developed to overcome some of the previously described limitations. One such technique is to employ a separate memory device to store each bit of a data word. That is, for a 36 bit data word, 36 memory devices may be used wherein each memory device may store one bit of the data word in this configuration, if a memory device fails, only one bit of the data word is affected. This may eliminate the last two types of problems discussed above. That is, this configuration may allow for a failure of a memory device to be detected and corrected as a single bit error rather than a multiple bit error.

This technique may be adequate for systems that use relatively small memory devices. However, as memory devices increase in storage capacity, there is a tendency for memory manufacturers to produce more parts that have a wider data interface. For example, 16 MEG DRAMs are being offered in configurations of 16M×1, 4M×4, 2M×8, and 1M×16, with the 4M×4 being the most popular. For 64 MEG DRAMs, some manufacturers are not planning to offer the 64 M×1 device. For these reasons, the error correction scheme used in systems employing large memory devices must account in some way for the wider data widths being offered by the manufacturers.

One technique currently employed is to read a plurality of data words from a number of memory elements whereby each bit in a corresponding data word is stored in a different one of the number of memory elements. A limitation of this scheme is that a plurality of data words must be read during each memory cycle. For example, if four bit wide memory devices are utilized, four data words must be read during each memory cycle wherein the first bit of each data word is read from the first memory device, the second bit of each data word is read from the second memory device, and so on. This requires that a relatively large number of bits be read simultaneously from the memory elements. Further, parity bits and other supporting hardware must be supplied for each of the four data words to reach acceptable levels of reliability. That is, the failure of one of the four memory devices would at most cause four single bit errors which could be detected using a single parity bit per word. However, parity bits and supporting hardware have to be provided to detect the four single bit errors.

Note that there may not always be four single bit errors even when an entire memory device fails. For example, if a failure is such that the failing bit matches the expected bit, the error will go undetected. This may be caused by a stuck output driver or other failure means. This may cause further problems in detecting errors associated with a memory device failure.

Another approach to error detection in a system utilizing multiple bit wide memory elements is to use complex error correction codes which can detect and correct multiple bit errors. However, as stated above, complex error correction codes require a substantial amount of support hardware including additional check bits and more complex logic.

Another approach is to utilize high reliability memory devices which may result in acceptable failure rates when averaged over the entire system. However, high reliability memory devices may be expensive, and thus may be cost prohibitive for low end systems. Further, as discussed above, a single failure in a memory device may result in an undetected failure in the data word.

Designers of some systems have combined the single bit error correction codes (SEC) with double bit error detection (DED) codes to further increase the reliability of computer systems which utilize multiple bit wide memory chips. One such scheme is suggested in "A Class of Odd-Weight-Column SEC-DED-SbED Codes for Memory System Application" by Shigeo Kaneda, IEEE Transactions on Computers, Vol. c-33, No. 8, August 1984. Kaneda suggests using a minimum odd-weighted rotational single-bit error correction (SEC), double bit error detection (DED), combined with a single-b-bit byte error detection (SbED) code scheme. SEC and DED error schemes are discussed above. The term "check bit" refers to an additional bit which is used for error correction or detection purposes. The generation of a check bit may include parity generation but may not be limited thereto. The number of check bits in an error correction code (ECC) may be determined by the number of bits in the data word which is the subject of the error correction code. The term "Odd-weighted" typically indicates that an error in a single bit of a data word affects an odd number of check bits.

There are several properties of an error correction code which may be important to increase the reliability of a particular computer system. First, it may be important that each check bit only be set by a unique subset of the data bits covered by the error correction code. This is indicated by having only a single code in each of the check bit columns within an error correction code. Second, it may be important that the number of check bits be closely matched to the data word which is the subject of the error correction code. This may minimize the number of extra check bits included in the system. Third, it may be important that the error correction code be able to detect errors in a multiple bit memory word.

Kaneda provides an odd weighted error correction code (ECC) but is limited to an even number of check bits. That is, the error correction code provided by Kaneda must have an even number of check bits to yield an odd weighted code. Further, an even number of check bits is required to yield a single code in each of the check bit columns. This may limit the optimization of the error correction code circuitry by requiring the addition of two extra check bits when only one check bit is required for the desired word width.

Kaneda states that if an odd number of check bits is required, the error correction code suggested in Construction-A of reference 11 should be used. Reference 11 of Kaneda refers to the article "Error-Correcting Codes with Byte Error-Detection Capability", by Chin-Long Chen, IEEE Transactions on Computers, Vol. c-32, No. 7, July 1983. Construction-A of Chen may be used to generate an error correction code having an odd number of check bits, but the resulting error correction code is not odd weighted. Further, the error correction code suggested by Chen does not provide a single code in each of the check bit columns.

SUMMARY OF THE INVENTION

The present invention overcomes many of the disadvantages of the prior art by providing an odd weighted error correction code which has an odd number of check bits and a single code in each of the check bit columns. Further, the present error correction code may detect byte errors thereby providing a mechanism for detecting errors within systems which employs multiple bit wide memory elements.

The data word in the exemplary embodiment may comprise 44 bits including 36 data bits, one IF bit, and seven check bits. The error correction code is odd weighted and may have a single code in each of the check bit columns. The 44 bit data word may comprise eleven (11) four bit bytes wherein each of the eleven (11) four bit bytes of the 44 bit data word are stored in a different memory element. Each of the 44 bits of the data word are stored in an appropriate one of the eleven (11) memory elements to maximize the error detection capability of the exemplary error correction code. The exemplary error correction code may: detect and correct all single bit errors in the 44 bit data word; detect all two bit errors in the 44 bit data word; detect all three bit errors in each of the eleven (11) four bit bytes of the 44 bit data word; and detect all four bit errors in each of the eleven (11) four bit bytes of the 44 bit data word.

In the exemplary embodiment, an Internal Flag Bit (IF bit) may be provided and stored with each data word. The IF bit is set when the write data is known to be corrupted, either because of a write data parity error or other corruption means. When a data word is read having the corresponding IF bit set, the requester is informed that the data word is corrupted. The exemplary error correction code includes the IF bit when performing error correction and detection.

The data word in the exemplary embodiment comprises 44 bits including 36 data bits, one IF bit, and seven check bits. The check bits are generated by computing odd parity of a predetermined subset of the 36 data bits and the IF bit. Each of the 36 data bits and the IF bit are included in an odd number of the check bit generation computations. That is, each of the 36 data bits and the IF bit may affect an odd number of the check bits. As stated above, this results in an odd weighted error correction code. Further, since each check bit may only be affected by a unique combination of bit errors, there is a single code in each of the check bit columns within the error correction code.

In the exemplary embodiment, eleven (11) four bit wide memory elements are utilized. As stated above, four bit wide memory elements are the most popular for large memory sizes. To ensure that a single failure in any one of the eleven (11) DRAM's is detected by the exemplary ECC, the data bits, the IF bit, and the check bits are grouped into predetermined four bit clusters which are assigned to a different one of the eleven (11) DRAM elements. The grouping is such that all errors which could be caused by a single DRAM failure, map into either a single bit error or a detectable multiple bit error.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 6 is a table showing an exemplary grouping of the data bits, IF bit, and check bits and the assignment thereof to the eleven (11) DRAM elements in accordance with the present invention;

DETAILED DESCRIPTION OF THE PREFERRED EMBODIMENTS

Figure 1:
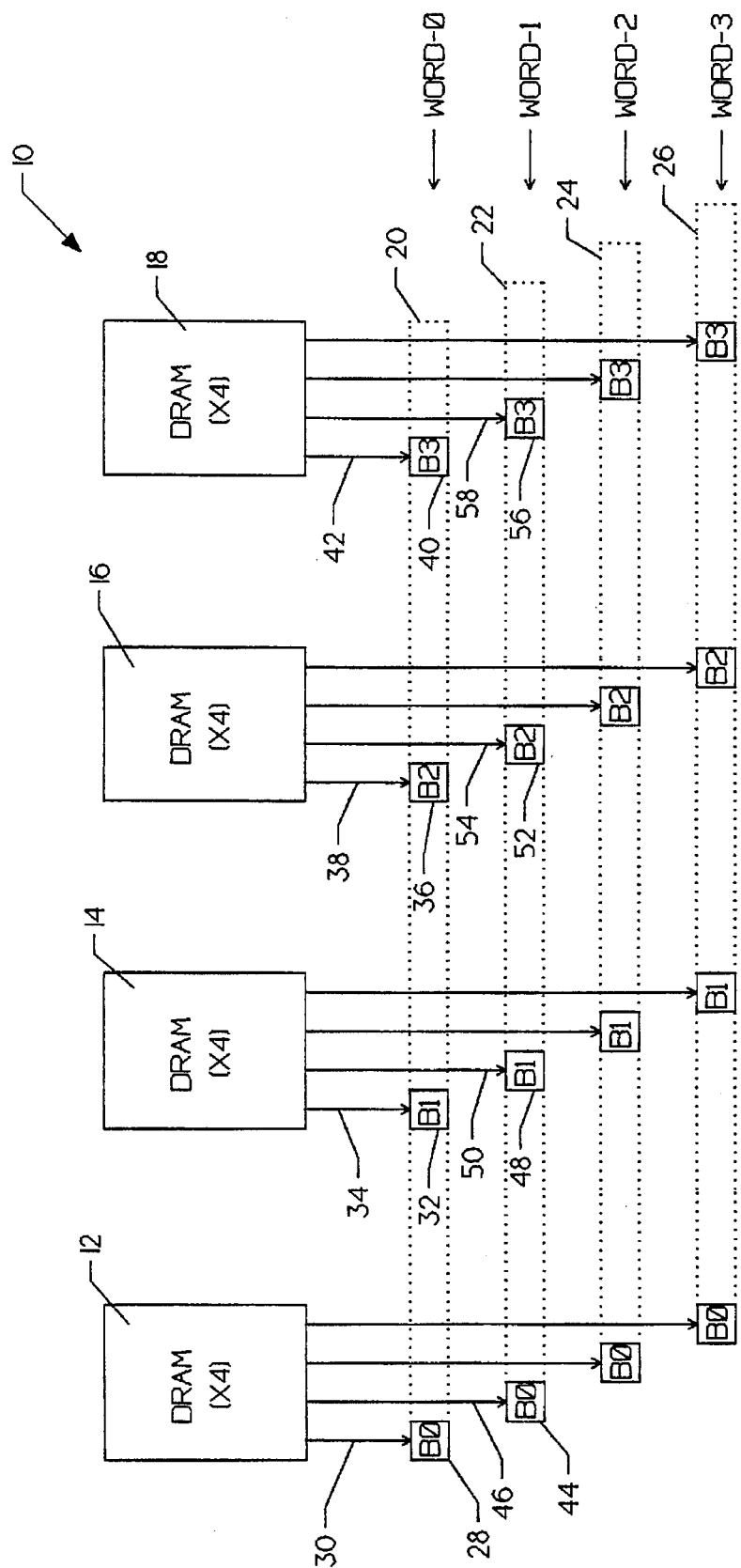
FIG. 1 is a block diagram of a prior art technique used to minimize the effects of the failure of a multiple bit wide memory element.

FIG. 1 is a block diagram of a prior art technique used to minimize the effects of the failure of a multiple bit wide memory element. The block diagram is generally shown at 10 and consists of four X4 DRAM elements 12, 14, 16, and 18. It is understood that more than four DRAM elements may be incorporated therein.

Referring to FIG. 1, four data words 20, 22, 24, and 26 are read from the four X4 DRAM elements 12, 14, 16, and 18 whereby each bit in a corresponding one of the data words 20, 22, 24, and 26 is stored in a different one of the four X4 DRAM elements 12, 14, 16, and 18. That is, for a Word-0 20, a first data bit 28 may be read from a first X4 DRAM element 12 via an interface 30, a second data bit 32 may be read from a second X4 DRAM element 14 via an interface 34, a third data bit 36 may be read from a third X4 DRAM element 16 via an interface 38, and a fourth data bit 40 may be read from a fourth X4 DRAM element 18 via an interface 42. For a Word-1 22, a first data bit 44 may be read from the first X4 DRAM element 12 via an interface 46, a second data bit 48 may be read from a second X4 DRAM element 14 via an interface 50, a third data bit 52 may be read from a third X4 DRAM element 16 via an interface 54, and a fourth data bit 56 may be read from a fourth X4 DRAM element 18 via an interface 58. The data bits for a Word-2 24 and a Word-3 26 may be similarly read.

A limitation of this technique is that a plurality of data words must be read during each memory cycle. That is, during a read operation, all four of the data words 20, 22, 24, and 26 must be read during each memory cycle. This requires a relatively large number of bits to be read simultaneously from the X4 DRAM elements 12, 14, 16, and 18. Further, parity bits and other supporting hardware must be supplied for each of the four data words 20, 22, 24, and 26 to reach acceptable levels of reliability. That is, the failure of one of the X4 DRAM elements 12, 14, 16, and 18 would at most cause four single bit errors which could be detected using a single parity bit per word. However, parity bits and supporting hardware would have to be provided to detect the four single bit errors.

The limitations discussed above are compounded when a wider DRAM is employed. For example, if a X16 DRAM is used, the system must read 16 data words during each read cycle. If each data word comprises 36 data bits, 576 bits must read from the 36 X16 DRAM's. Further, parity bits and supporting hardware must be provided for each data word. It can readily be seen that the technique shown in FIG. 1 may not be efficient for large computer systems which utilize wide memory elements.

A further limitation of the above referenced technique may be that four single bit errors may not always result when an entire X4 DRAM element 12, 14, 16, or 18 fails. For example, if a failure is such that the failing bit matches the expected bit, the error will go undetected. This may be caused by a stuck output driver or other failure means. This may cause otherwise detectable errors to become undetectable thereby reducing the reliability of the computer system.

Figure 2:
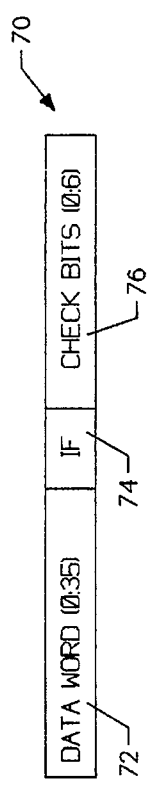
FIG. 2 is a diagram showing a data word of an exemplary embodiment of the present invention.

FIG. 2 is a diagram showing an exemplary data word of the present invention. The data word is generally shown at 70 and may comprise a thirty six (36) bit data word 72, an Internal Flag (IF) bit 74, and seven check bits 76.

In the exemplary embodiment, the Internal Flag (IF) bit 74 may be provided and stored with each data word 72. The IF bit 74 may be set when a write data word 72 is known to be corrupted, either because of a write data parity error or other corruption means. When the data word 72 is read and it is determined that the corresponding IF bit 74 is set, the requester is informed that the data word 72 is corrupted. The exemplary error correction code (see below) includes the IF bit 74 when performing error correction and detection.

The check bits 76 are generated by computing odd parity of a predetermined subset of the 36 bit data word 72 and, in some cases, the IF bit 74. The predetermined subset is defined by the exemplary error correction code. In the exemplary error correction code, each of the 36 data bits in data word 72 and the IF bit 74 are included in an odd number of the check bit generation computations. That is, an error in any one of the 36 data bits in data word 72 or the IF bit 74 may affect an odd number of check bits 76. As stated above, this results in an odd weighted error correction code. Further, each of the check bits 76 may only be affected by a unique combination of bit errors. That is, there may be a single code in each of the check bit columns within the error correction code (see below).

Figure 3:
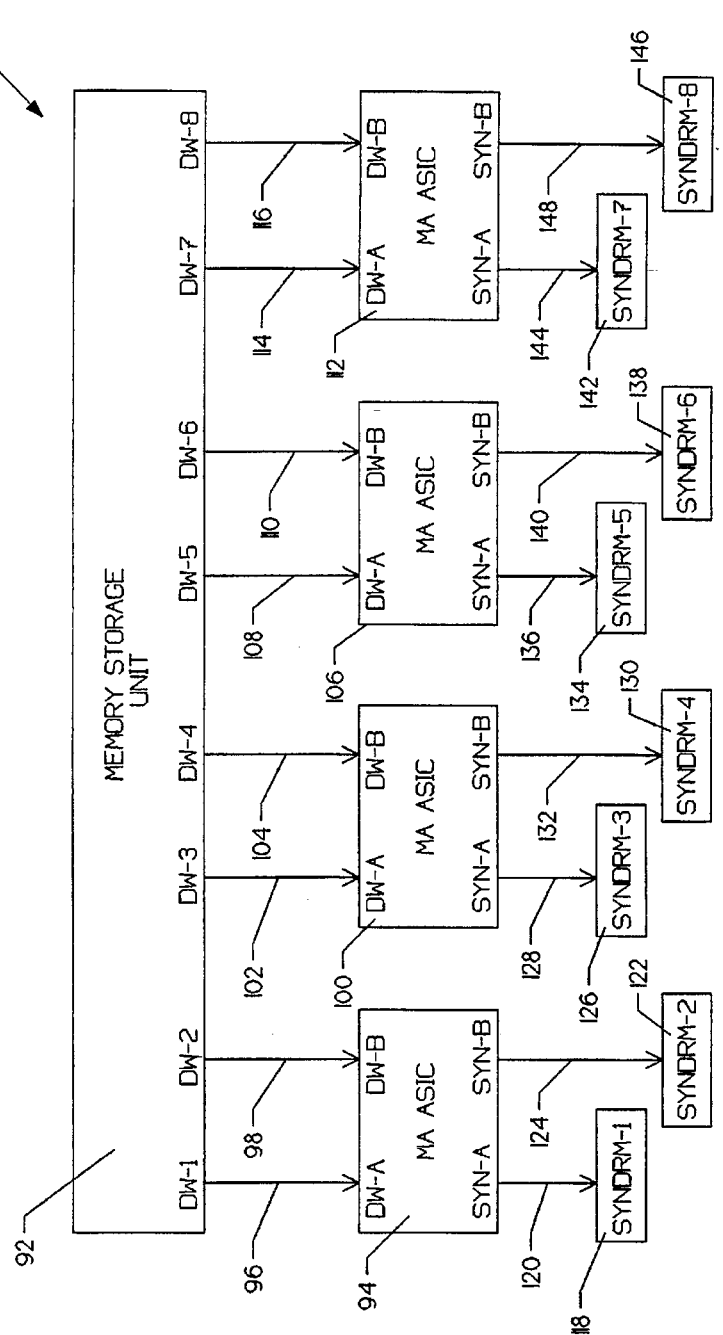
FIG. 3 is a block diagram of a memory card of the exemplary embodiment of the present invention.

FIG. 3 is a block diagram of a memory card of an exemplary embodiment of the present invention. The memory card is generally shown at 90 and may comprise a memory storage unit 92 and four MA ASIC circuits 94, 100, 106, and 112. The memory storage unit 90 is capable of reading eight (8) data words during each read cycle. Although the exemplary embodiment of the memory storage unit 92 may read eight (8) data words during each read cycle, it is not required. It is recognized that more or less data words may be read during etch read cycle and still be within the scope of the present invention.

MA ASIC circuit 94 may be coupled to memory storage unit 92 via interfaces 96 and 98. A first data word and a second data word may be read from memory storage unit 92 and transmitted to MA ASIC circuit 94 via interfaces 96 and 98, respectively. MA ASIC circuit 94 may generate a first syndrome 118 for the first data word and a second syndrome 122 for the second data word. The first syndrome 118 may represent a comparison between the check bits of the first data word that is read from memory storage unit 92 and a first set of regenerated check bits generated by MA ASIC circuit 94. Similarly, the second syndrome 122 may represent a comparison between the check bits of the second data word that is read from memory storage unit 92 and a second set of regenerated check bits generated by MA ASIC circuit 94.

MA ASIC circuit 100 may be coupled to memory storage unit 92 via interfaces 102 and 104. A third data word and a fourth data word may be read from memory storage unit 92 and transmitted to MA ASIC circuit 100 via interfaces 102 and 104, respectively. MA ASIC circuit 100 may generate a third syndrome 126 for the third data word and a fourth syndrome 130 for the fourth data word. The third syndrome 126 may represent a comparison between the check bits of the third data word that is read from memory storage unit 92 and a first set of regenerated check bits generated by MA ASIC circuit 100. Similarly, the fourth syndrome 130 may represent a comparison between the check bits of the fourth data word that is read from memory storage unit 92 and a second set of regenerated check bits generated by MA ASIC circuit 100.

MA ASIC circuit 106 may be coupled to memory storage unit 92 via interfaces 108 and 110. A fifth data word and a sixth data word may be read from memory storage unit 92 and transmitted to MA ASIC circuit 106 via interfaces 108 and 110, respectively. MA ASIC circuit 106 may generate a fifth syndrome 134 for the fifth data word and a sixth syndrome 138 for the sixth data word. The fifth syndrome 134 may represent a comparison between the check bits of the fifth data word that is read from memory storage unit 92 and a first set of regenerated check bits generated by MA ASIC circuit 106. Similarly, the sixth syndrome 138 may represent a comparison between the check bits of the sixth data word that is read from memory storage unit 92 and a second set of regenerated check bits generated by MA ASIC circuit 106.

Finally, MA ASIC circuit 112 may be coupled to memory storage unit 92 via interfaces 114 and 116. A seventh data word and an eighth data word may be read from memory storage unit 92 and transmitted to MA ASIC circuit 112 via interfaces 114 and 116, respectively. MA ASIC circuit 112 may generate a seventh syndrome 142 for the seventh data word and an eighth syndrome 146 for the eighth data word. The seventh syndrome 142 may represent a comparison between the check bits of the seventh data word that is read from memory storage unit 92 and a first set of regenerated check bits generated by MA ASIC circuit 112. Similarly, the eighth syndrome 146 may represent a comparison between the check bits of the eighth data word that is read from memory storage unit 92 and a second set of regenerated check bits generated by MA ASIC circuit 112.

Figures 7, 8:
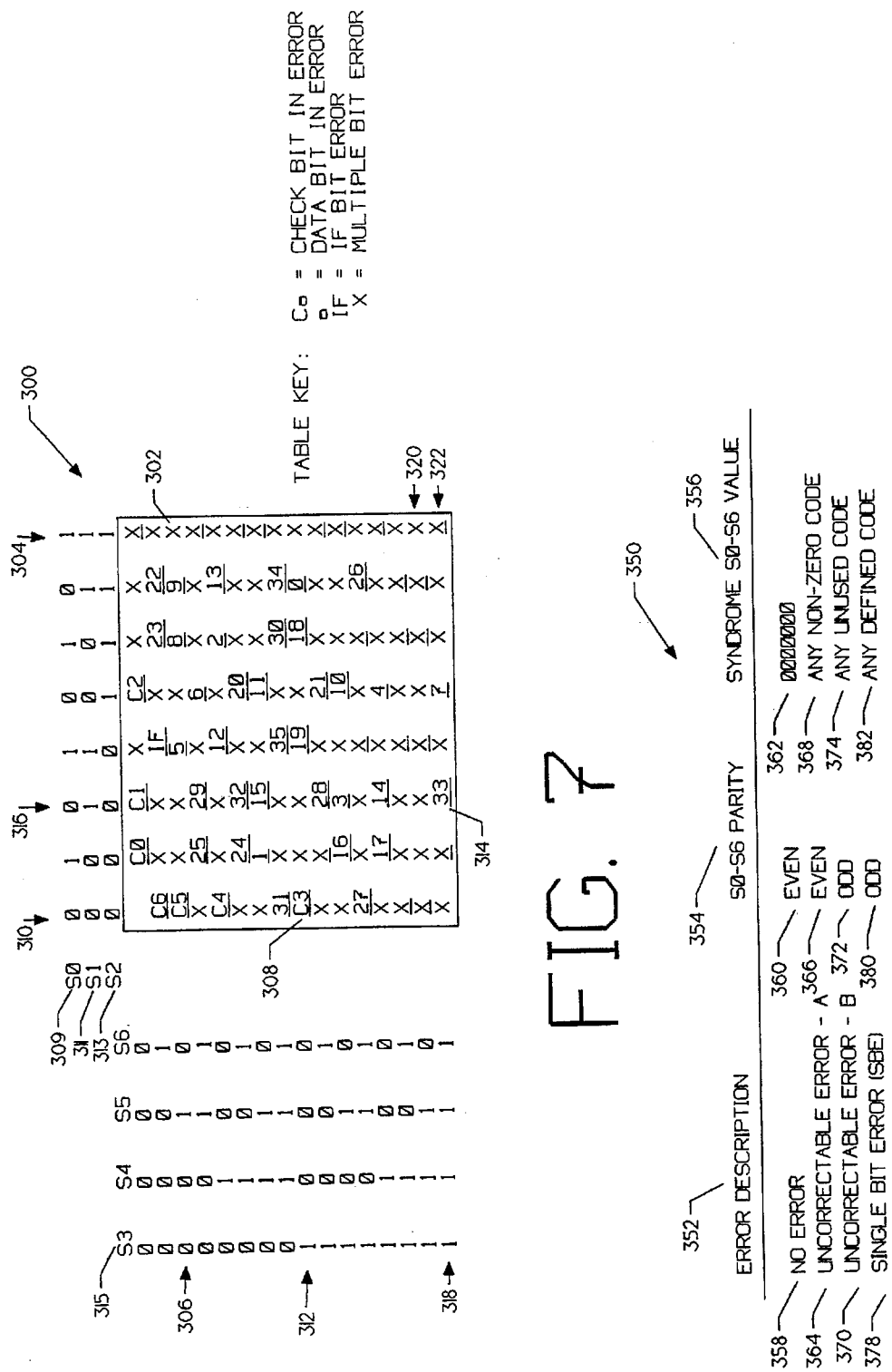
FIG. 7 is a table showing the syndrome matrix of the exemplary embodiment of the present invention.
FIG. 8 is a table correlating an error description with syndrome parity and a corresponding syndrome value.

In the exemplary embodiment, the syndrome codes 118, 122, 126, 130, 134, 138, 142, and 146 provided by MA ASIC circuits 94, 100, 106, and 112 may comprise a seven bit code. The seven bit syndrome codes 118, 122, 126, 130, 134, 138, 142, and 146 may indicate whether there is no error, a single bit error (and which bit is in error), or a multiple bit error in the corresponding data word. An exemplary syndrome matrix showing the relationship between the syndrome code and the corresponding error is shown in FIG. 7.

Figure 4:
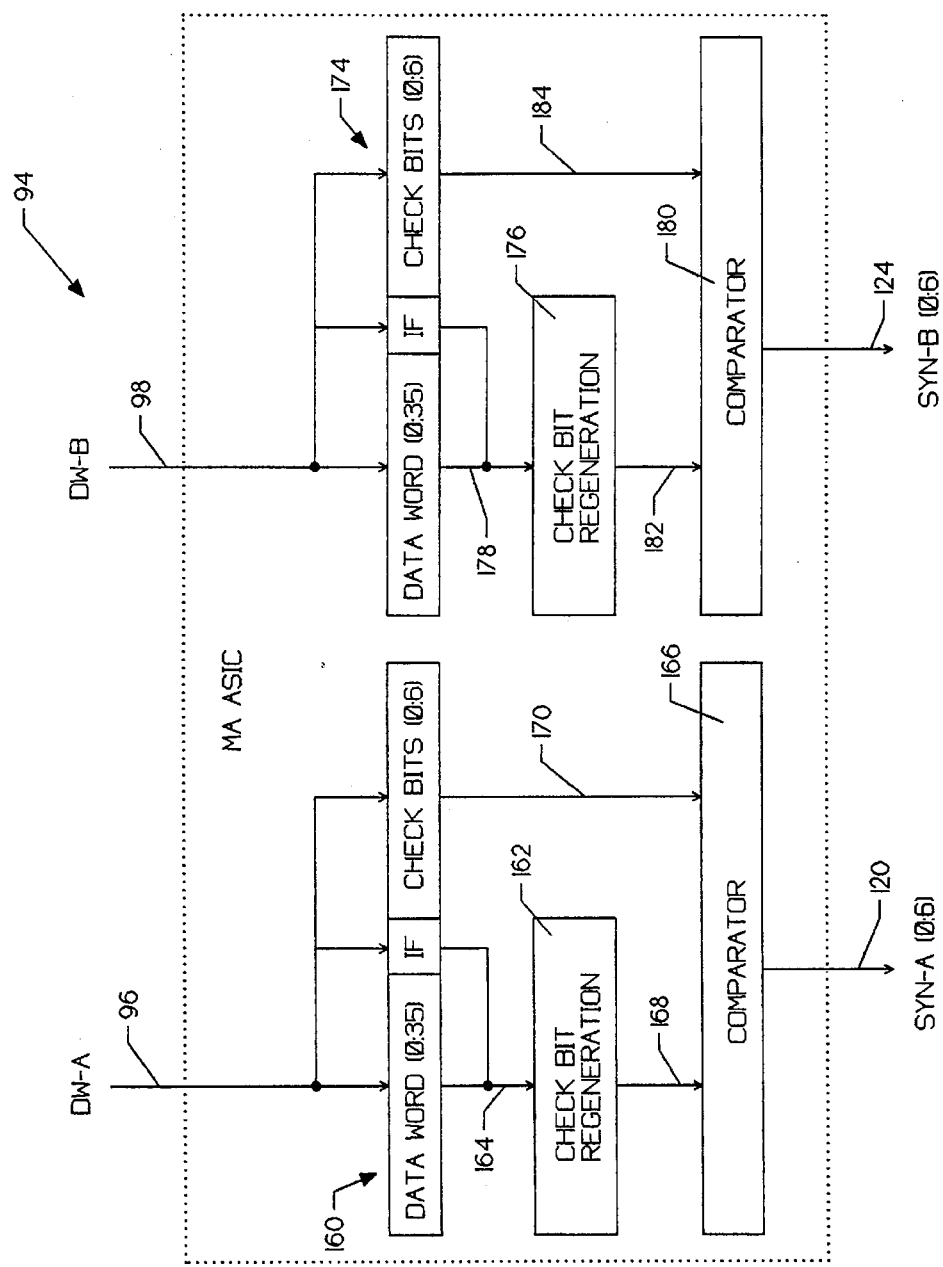
FIG. 4 is a schematic diagram of an MA ASIC block of FIG. 3.

FIG. 4 is a schematic diagram of an MA ASIC block of FIG. 3. To illustrate the function of the MA ASIC circuits 94, 100, 106, and 112 of FIG. 3, a schematic diagram of MA ASIC circuit 94 is provided in FIG. 4. It is recognized that MA ASIC circuits 100, 106, and 112 may be similarly constructed.

MA ASIC circuit 94 may comprise two identical circuits wherein each of the two identical circuits services one of the two data words provided to MA ASIC circuit 94 via interfaces 96 and 98. In a first of the identical circuits, a data word is provided to a data register 160 via interface 96. Data register 160 may store the data word that is read from memory storage unit 92 (see FIG. 3) including a thirty six (36) bit data word, an IF bit, and seven check bits. The thirty six (36) bit data word and the IF bit may be provided to a check bit re-generation circuit 162. Check bit re-generation circuit 162 may regenerate the seven check bits in accordance with the error correction code of the present invention (see FIGS. 5–8). A comparator 166 may receive the regenerated check bits from check bit re-generation circuit 162 via interface 168 and may further receive the original check bits from data register 160 via interface 170. Comparator 166 may compare the original check bits with the regenerated check bits and may provide the result as a syndrome code on interface 120. In the exemplary embodiment, comparator 166 may provide a "1" when a corresponding original check bit and a corresponding re-generated check bit are not related in a predetermined way. For example, comparator 166 may provide a "1" when a corresponding original check bit and a corresponding regenerated check bit are not equal.

In a second of the identical circuits, a data word is provided to a data register 174 via interface 98. Data register 174 may store the data word that is read from memory storage unit 92 (see FIG. 3) including a thirty six (36) bit data word, an IF bit, and seven check bits. The thirty six (36) bit data word and the IF bit may be provided to a check bit re-generation circuit 176. Check bit re-generation circuit 176 may regenerate seven check bits in accordance with the error correction code of the present invention (see FIGS. 5–8). A comparator 180 may receive the regenerated check bits from check bit re-generation circuit 176 via interface 182 and may further receive the original check bits from data register 174 via interface 184. Comparator 180 may compare the original check bits with the regenerated check bits and may provide the result as a syndrome code on interface 124. In the exemplary embodiment, comparator 180 may provide a "1" when a corresponding original check bit and a corresponding re-generated check bit are not related in a predetermined way. For example, comparator 180 may provide a "1" when a corresponding original check bit and a corresponding regenerated check bit are not equal.

Figure 5:
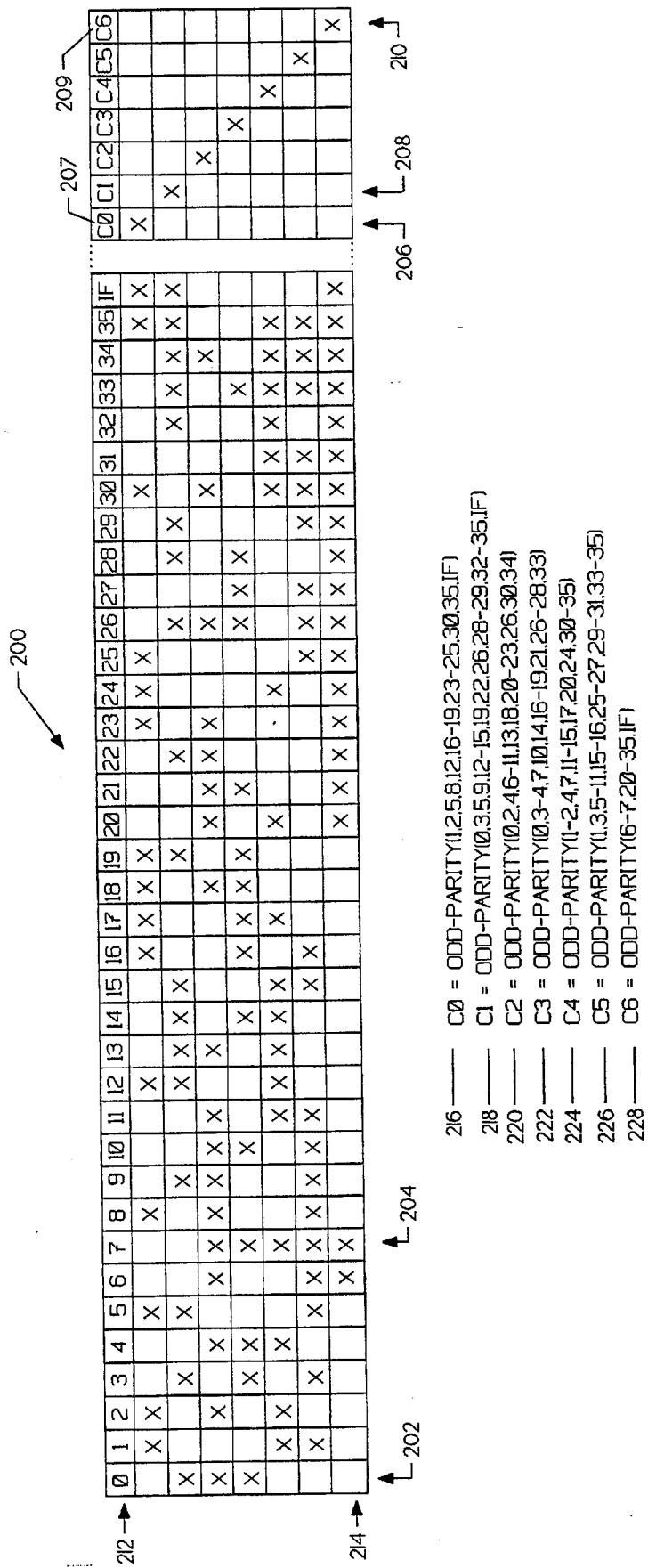
FIG. 5 is a table showing an exemplary embodiment of the error correction code of the present invention.

FIG. 5 is a table showing an exemplary embodiment of the error correction code of the present invention. The exemplary error correction code is generally shown at 200 and comprises an odd number of check bits and a single code in each of the check bit columns. Further, the exemplary error correction code may detect byte errors thereby providing a mechanism for detecting errors within system which employs multiple bit wide memory elements.

In the exemplary embodiment, the error correction code is odd weighted and comprises seven check bits. Further, the exemplary error correction code has a single code in each of the check bit columns as shown at columns 208 and 210, and services a 36 bit data word and an IF bit. As stated above, the Internal Flag (IF) bit may be provided and stored with each data word. The IF bit may be set when a write data word is known to be corrupted, either because of a write data parity error or other corruption means. When the data word is read and it is determined that the corresponding IF bit set, the requester is informed that the data word is corrupted. The exemplary error correction code includes the IF bit when performing error correction and detection.

The check bits are generated by computing odd parity of a predetermined subset of the 36 bit data word and, in some cases, the IF bit. The predetermined subset is defined by the exemplary error correction code. In the exemplary error correction code, each of the 36 data bits in the data word and the IF bit are included in an odd number of the check bit generation computations. For example, data-bit-0 is included in three check bit computations as shown at column 202, data-bit-7 is included in five check bit computations as shown at column 204, and the IF bit is included in three check bit computations as shown at column 206. This indicates that an error in any one of the 36 data bits in the data word or the IF bit may affect an odd number of check bits. As stated above, this results in an odd weighted error correction code. Further, each of the check bits may only be affected by one combination of bit errors. That is, there may be a single code in each of the check bit columns within the error correction code. For example, check bit-0 207 and check bit-6 209 only have a single code thereunder as shown at columns 208 and 210, respectively.

The seven (7) check bits of the exemplary error correction code are generated in accordance with the table shown in FIG. 5. Each of the check bits is generated by computing odd parity of the data bits and the IF bit which have an "X" in the same row as the corresponding "X" under the check bit. The exemplary error correction code may best be described by example. Check Bit C0 207 may be generated by computing odd parity for all of the data bits and the IF bit having an "X" in the row indicated as 212. That is, check bit C0 may be generated by computing odd parity of data bits 1,2,5,8,12,16–19,23–25,30,35, and the IF bit as shown at 216. Similarly, check bit C6 may be generated by computing odd parity of data bits 6–7,20–35, and the IF bit as shown at 228. Check bits C1–C5 may be similarly generated as shown at 218, 220, 222, 224, and 226, respectively.

A concrete example of the exemplary error correction code may prove helpful for the proper understanding thereof. For a write data word comprising all zeros with no parity error (IF=0), the resulting check bit pattern would be "1111111". For a write data word comprising all zeros with a parity error (IF=1), the resulting check bit pattern would be "0011110".

Figure 6:
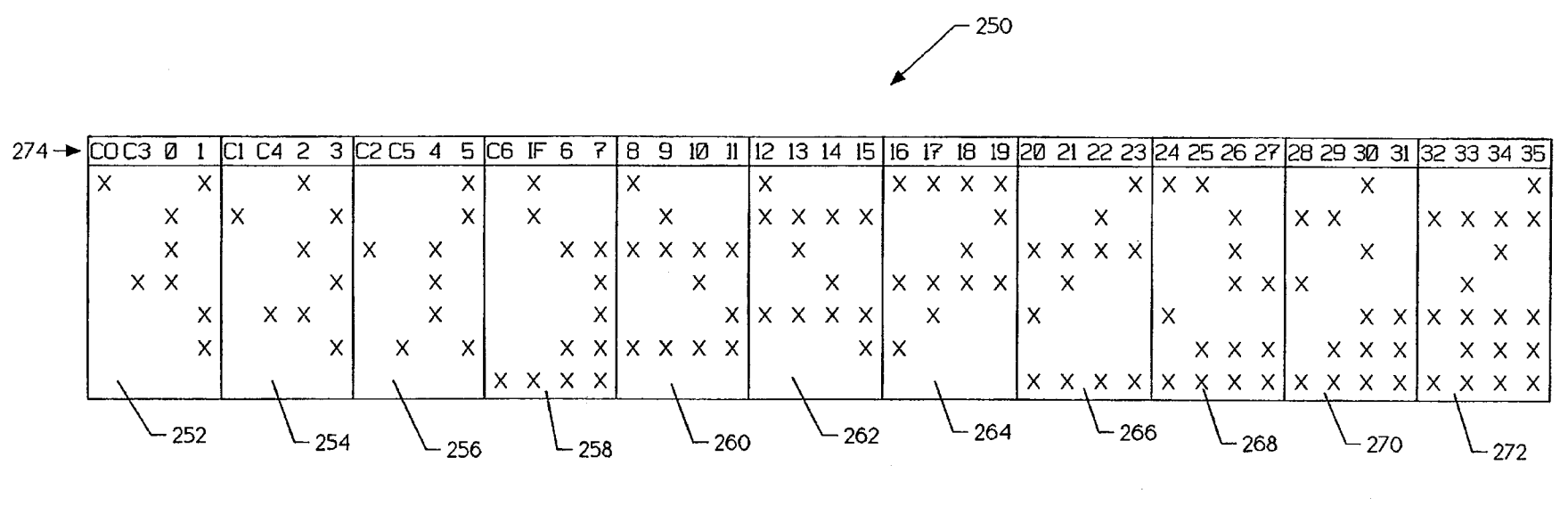

FIG. 6 is a table showing an exemplary grouping of the data bits, IF bit, and check bits and the assignment thereof to the eleven (11) DRAM elements in accordance with the present invention. The table is generally shown at 250.

In an exemplary embodiment, the data word may comprise 44 bits including 36 data bits, one IF bit, and seven check bits. Eleven (11) four bit wide memory elements may be utilized to store the 44 bit data word. As stated above, four bit wide memory elements are the most popular for large memory sizes. To ensure that a single failure in any one of the eleven (11) DRAM's is detected by the exemplary ECC, the data bits, the IF bit, and the check bits are grouped into predetermined four bit clusters which are assigned to a different one of the eleven (11) DRAM elements. The grouping is such that all errors which could be caused by a single DRAM failure, map into either a single bit error or a detectable multiple bit error.

Referring to FIG. 6, the eleven (11) four bit wide memory elements are represented as elements 252, 254, 256, 258, 260, 262, 264, 266, 268, 270, and 272. The corresponding location of each of the 44 bits of the data word is indicated in row 274. For example, check-bit-0, check-bit-3, data-bit-0, and data-bit-1 may be stored in a first four bit wide memory element 252. Similarly, check-bit-1, check-bit-4, data-bit-2, and data-bit-3 may be stored in a second four bit wide memory element 254. The location of the remainder of the bits of the 44 bit data word are similarly shown in FIG. 6.

Because the exemplary error correction code is odd weighted, any even number of bits in error may yield a syndrome with an even number of bits set. However, for typical odd weighted error correction codes, some failures with an even number of bits in error may yield a syndrome of all zeros, which would indicate that no bits are in error. To prevent this false indication, the exemplary error correction code is structured so that all of the groups will not have an all zeros syndrome when an even number of bits within a memory device are in error. Any odd number of bits in error may yield a syndrome with an odd number of bits set. A syndrome with an odd number of bits set is detectable by the exemplary error correction code as either a single bit error, or a three bit error within a grouping.

In accordance with the grouping shown in FIG. 6 and the exemplary error correction shown in FIG. 5, the exemplary error correction code may: detect and correct all single bit errors in the 44 bit data word; detect all two bit errors in the 44 bit data word; detect all three bit errors in each of the eleven (11) four bit bytes of the 44 bit data word; and detect all four bit errors in each of the eleven (11) four bit bytes of the 44 bit data word.

FIG. 7 is a table showing a syndrome matrix of the exemplary embodiment of the present invention. The syndrome matrix is generally shown at 300. As stated with reference to FIG. 3, a syndrome may represent a comparison between the check bits of the data word read from memory storage unit 92 and a set of regenerated check bits generated by MA ASIC circuit 94. That is, a bit-by-bit comparison may be made between the seven check bits read from memory storage unit 92 and a set of seven check bits regenerated by check bit re-generation block 162. The result is a seven bit code which is referred to as a "syndrome". If the comparator 166 detects a difference between two corresponding bits, a corresponding syndrome bit may be set to a predetermined value. In the exemplary embodiment, comparator 166 may generate a "1" when a difference between the two corresponding bits is detected.

Seven "syndrome" bits are indicated on FIG. 7. Syndrome bit-0 (S0) is shown at 309, syndrome bit-1 (S1) is shown at 311, syndrome bit-2 (S2) is shown at 313, and syndrome bit-3 (S3) is shown at 315. Syndrome bits 4–6 (S4–S6) are similarly shown. Each of the syndrome bits S0–S2 have a corresponding row of values associated therewith and each of the syndrome bits S3–S6 have a corresponding column of values associated therewith. The corresponding row of values and the corresponding column of values may be read in conjunction to determine which combination of syndrome bits correspond to a particular error. That is, the syndrome matrix shown in FIG. 7 shows all combinations of the exemplary seven bit syndrome code and the errors associated therewith. The odd syndrome codes, as indicated by having an odd number of syndrome bits set, are marked with an underline.

The syndrome matrix may best be described by example. The error indicated by a syndrome code of "0001000" is shown at the intersection of column 310 and row 312. That is, a syndrome code of "0001000" indicates an error in check-bit-3 (C3) as shown at 308. Similarly, the error indicated by a syndrome code of "1110010" is shown at the intersection of column 304 and row 306. That is, a syndrome code of "1110010" indicates a multiple bit uncorrectable error as shown at 302. The positions marked by an "X" within the syndrome matrix indicate a multiple bit fault that can be detected as such. The error indicated by a syndrome code of "0101111" is shown at the intersection of column 316 and row 318. That is, a syndrome code of "0101111" indicates an error in data-bit-33 as shown at 314. Other combinations of the syndrome bits and the error associated therewith may be similarly found.

A unique aspect of the exemplary error correction code is that all three bit errors which occur within a single four bit memory element as defined in FIG. 6, have a syndrome with either (S0=S1=S2=1) OR ((S3=S4=S5=1 AND S6=0) OR (S3=S4=S6=1 AND S5=0))). These three conditions correspond to the column shown at 304 and the rows shown at 320 and 322. This information can be used to detect whole memory failures within the system.

Using the syndromes indicated in FIG. 7, along with the bit groupings indicated in FIG. 6, and the check bit assignments indicated in FIG. 5, all two, three, and four bit errors which may occur within any of the four bit groupings may be detected.

FIG. 8 is a table correlating an error description with syndrome parity and a corresponding syndrome value. In the exemplary error correction code, all single bit errors have syndromes other than those used by the three bit errors. Further, all single bit errors map into syndromes which have an odd number of bits set, as indicated by an underline in FIG. 7. There are in fact 48 possible single bit error syndromes available rather than the 44 as shown above because four additional columns may be added to the exemplary error correction code.

All even bit syndromes except for the all zeros case may be mapped into a multiple bit error. All double bit errors and most even bit errors are detected as multiple bit errors. Some even bit errors may map into the all zeros syndrome and may go undetected. However, as stated above, the exemplary error correction code may be structured so that all of the four bit groups as shown in FIG. 6 will not have an all zeros syndrome when an even number of bits within a memory device are in error.

Referring to FIG. 8, a list of error descriptions is shown at 352. The error description includes various error conditions including a no error condition 358, an uncorrectable error-A condition 364, an uncorrectable error-B condition 370, and a single bit error condition 378. The even and odd mapping for the corresponding syndrome bits (S0–S6) to each error condition is shown in column 354. Further, the syndrome value for each error condition is shown in column 356. For example, for the no error condition 358, an even number of syndrome bits may be set and the syndrome value may be "0000000". For the uncorrectable error-A condition 364, an even number of syndrome bits may be set and the syndrome value may be any non-zero code. For the uncorrectable error-B condition 370, an odd number of syndrome bits may be set and the syndrome value may be any unused code. Finally, for the single bit error condition 378, an even number of syndrome bits may be set and the syndrome value may be any defined code.

Figure 9:
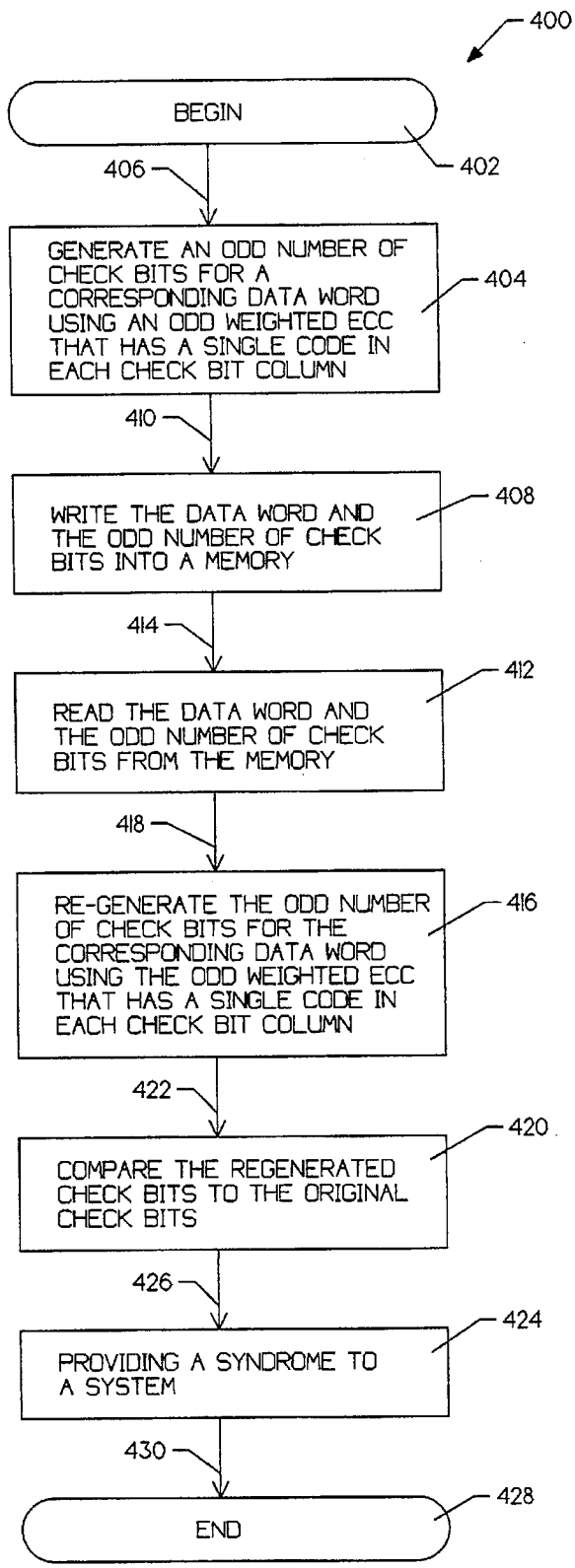
FIG. 9 is a flow diagram of a first embodiment of the present invention.

FIG. 9 is a flow diagram of a first embodiment of the present invention. The flow diagram is generally shown at 400. The flow diagram is entered at element 402 wherein control is passed to element 404 via interface 406. Element 404 generates an odd number of check bits for a corresponding data word using an odd weighted error correction code which has a single code in each check bit column. Control is then passed to element 408 via interface 410. Element 408 writes the data word and the odd number of check bits into a memory element. Control is then passed to element 412 via interface 414. Element 412 reads the data word and the odd number of check bits from the memory element referred to in element 408. Control is then passed to element 416 via interface 418. Element 416 regenerates the odd number of check bits for the corresponding data word read in element 412. The odd number of check bits are regenerated using the odd weighted error correction code referred to in element 404. Control is then passed to element 420 via interface 422.

Element 420 compares the regenerated check bits generated in element 416 with the original check bits generated in element 404. Control is then passed to element 424 via interface 426. Element 424 provides a syndrome to a system. The syndrome is a result of the compare function performed in element 420. Control is then passed to element 428 via interface 430 wherein the flow diagram is exited.

Figure 10:
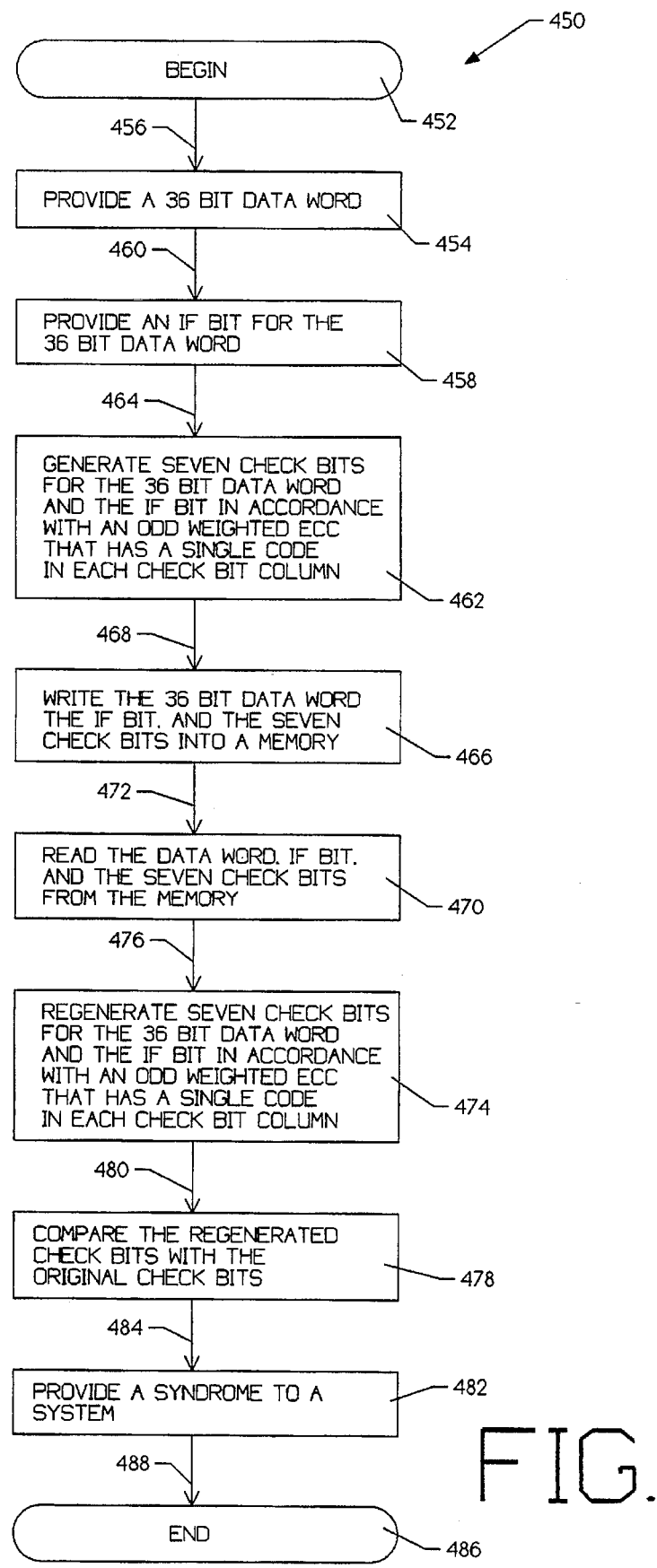
FIG. 10 is a detailed flow diagram of a second embodiment of the present invention.

FIG. 10 is a detailed flow diagram of a second embodiment of the present invention. The detailed flow diagram is generally shown at 450. The detailed flow diagram is entered at element 452 wherein control is passed to element 454 via interface 456. Element 454 provides a 36 bit data word. Control is then passed to element 458 via interface 460.

Element 458 provides an IF bit for the 36 bit data word. As stated above, the IF bit is set when the write data is known to be corrupted. It is recognized that the IF bit may be provided but is not necessary to be within the scope of the present invention. Control is then passed to element 462 via interface 464. Element 462 generates seven check bits for the 36 bit data word (and the IF bit if it is included). The seven check bits may be generated in accordance with an odd weighted error correction code which has a single code in each check bit column. Control is then passed to element 466 via interface 468.

Element 466 writes the 36 bit data word, the IF bit if it is included, and the seven check bits into a memory element. It is recognized that element 466 may provide the 36 bit data word, the IF bit if it is included, and the seven check bits to something other than a memory device and still be within the scope of the present invention. For example, element 466 may provide the 36 bit data word, the IF bit if it is included, and the seven check bits to a processor, I/O port, etc. Control is then passed to element 470 via interface 472.

Element 470 reads the 36 bit data word, the IF bit if it is included, and the seven check bits from the memory device or other element referenced in element 466. Control is then passed to element 474 via interface 476. Element 474 regenerates the seven check bits from the 36 bit data word (and the IF bit if it is included) read in element 470. Element 474 regenerates the seven check bits in accordance with the odd weighted error correction code referenced in element 462. Control is then passed to element 478 via interface 480. Element 478 compares the regenerated check bits generated by element 474 with the original check bits generated by element 462. Control is then passed to element 482 via interface 484. Element 482 provides a syndrome to a system. The syndrome referred to in element 482 is a result of the compare function performed in element 478. Control is then passed to element 486 via interface 488 wherein the detailed flow diagram is exited.

It is recognized that element 462 and element 474 may generate the check bits for the 36 bit data word and the IF bit in accordance with the table shown in FIG. 5. For example, check-bit-0 may be generated as C0=odd parity (1,2,5,8,12,16–19, 23–25,30,35,IF).

It is also recognized that element 466 may write the 36 bit data word, the IF bit, and the seven check bits to eleven (11) four bit wide memory elements. Further, it is recognized that element 466 may write each of the individual bits of the 36 bit data word, the IF bit, and the seven check bits to an appropriate one of the eleven (11) memory elements in accordance with the table shown in FIG. 6. For example, a first one of the eleven (11) four bit wide memory elements may store check-bit-0 (C0), check-bit-3 (C3), data-bit-0 (0), and data-bit-1 (1).

Similarly, element 470 may read the 36 bit data word, the IF bit, and the seven check bits from the eleven (11) four bit wide memory elements. Further, it is recognized that element 470 may read each of the individual bits of the 36 bit data word, the IF bit, and the seven check bits from an appropriate one of the eleven (11) memory elements in accordance with the table shown in FIG. 6. For example, element 470 may read check-bit-0 (C0), check-bit-3 (C3), data-bit-0 (0), and data-bit-1 (1) from the first one of the eleven (11) four bit wide memory elements.

Having thus described the preferred embodiments of the present invention, those of skill in the art will readily appreciate that the teachings found herein may be applied to yet other embodiments within the scope of the claims hereto attached.

I claim:

1. In a system having a plurality of multiple bit wide memory elements wherein said plurality of multiple bit wide memory elements are for storing a data word having a plurality of bits, the improvement comprising:

a. error correction code means for generating an odd number of check bits for the data word, said error correction code being odd weighted and having a number of check bit columns wherein each of said number of check bit columns correspond to one of said odd number of check bits, said error correction code means having a single code in each of the number of check bit columns;

b. grouping means for grouping the plurality of bits of the data word and said odd number of check bits into a plurality of predetermined clusters;

c. storing means for storing each of said plurality of predetermined clusters into a different one of the plurality of multiple bit wide memory elements;

d. wherein said odd number of check bits comprises seven check bits; and e. wherein the plurality of bits of the data word comprises 36 data bits (0–35) and an IF bit.

2. An apparatus according to claim 1 wherein said error correction code means generates said seven check bits (C0–C6) as follows:

| Check bit # | Calculation Method |
|---|---|
| C0 | ODD-PARITY (1,2,5,8,12,16–19,23–25,30,35,IF) |
| C1 | ODD-PARITY (0,3,5,9,12–15,19,22,26,28–29,32–35,IF) |
| C2 | ODD-PARITY (0,2,4,6–11,13,18,20–23,26,30,34) |
| C3 | ODD-PARITY (0,3–4,7,10,14,16–19,21,26–28,33) |
| C4 | ODD-PARITY (1–2,4,7,11–15,17,20,24,30–35) |
| C5 | ODD-PARITY (1,3,5–11,15–16,25–27,29–31,33–35) |
| C6 | ODD-PARITY (6–7,20–35,IF) |

3. An apparatus according to claim 2 wherein said grouping means groups said 36 bits of the data word, said IF bit, and said seven check bits into eleven clusters (Cluster-0→Cluster-10) as follows:

| Cluster # | Bit Groupings |
|---|---|
| Cluster-0 | C0, C3, 0, 1 |
| Cluster-1 | C1, C4, 2, 3 |
| Cluster-2 | C2, C5, 4, 5 |
| Cluster-3 | C6, IF, 6, 7 |
| Cluster-4 | 8, 9, 10, 11 |
| Cluster-5 | 12, 13, 14, 15 |
| Cluster-6 | 16, 17, 18, 19 |
| Cluster-7 | 20, 21, 22, 23 |
| Cluster-8 | 24, 25, 26, 27 |

| Cluster # | Bit Groupings |
|---|---|
| Cluster-9 | 28, 29, 30, 31 |
| Cluster-10 | 32, 33, 34, 35 |

4. An apparatus according to claim 3 wherein said plurality of multiple bit wide memory elements comprises eleven memory multiple bit wide elements and wherein each of said eleven clusters is stored in a corresponding one of said eleven multiple bit wide memory elements.

5. An apparatus according to claim 4 wherein each of said eleven multiple bit wide memory elements comprises a X4 DRAM memory element.

6. An apparatus for detecting and correcting errors in a data word, the data word having a plurality of bits, comprising;
   a. a check bit generation circuit for generating an odd number of check bits for the data word, said check bit generation circuit generating said odd number of check bits in accordance with an odd weighted error correction code having a number of check bit columns wherein each of said number of check bit columns correspond to one of said odd number of check bits, the error correction code having a single code in each of the number of check bit columns;
   b. a grouping circuit for grouping the plurality of bits of the data word and said odd number of check bits into a plurality of predetermined clusters;
   c. a storing circuit for storing each of said plurality of predetermined clusters into a different one of a plurality of memory elements;
   e. wherein said odd number of check bits comprises seven check bits; and
   f. wherein the plurality of bits of the data word comprises 36 data bits (0–35) and an IF bit.

7. An apparatus according to claim 6 wherein said error correction code generates said seven check bits (C0–C6) as follows:

| Check bit # | Generation Method |
|---|---|
| C0 | ODD-PARITY (1,2,5,8,12,16–19,23–25,30,35,IF) |
| C1 | ODD-PARITY (0,3,5,9,12–15,19,22,26,28–29,32–35,IF) |
| C2 | ODD-PARITY (0,2,4,6–11,13,18,20–23,26,30,34) |
| C3 | ODD-PARITY (0,3–4,7,10,14,16–19,21,26–28,33) |
| C4 | ODD-PARITY (1–2,4,7,11–15,17,20,24,30–35) |
| C5 | ODD-PARITY (1,3,5–11,15–16,25–27,29–31,33–35) |
| C6 | ODD-PARITY (6–7,20–35,IF) |

8. An apparatus according to claim 7 wherein said grouping circuit groups said 36 bits of the data word, said IF bit, and said seven check bits into eleven clusters (Cluster-0→Cluster-10) as follows:

| Cluster # | Bit Groupings |
|---|---|
| Cluster-0 | C0, C3, 0, 1 |
| Cluster-1 | C1, C4, 2, 3 |
| Cluster-2 | C2, C5, 4, 5 |
| Cluster-3 | C6, IF, 6, 7 |
| Cluster-4 | 8, 9, 10, 11 |
| Cluster-5 | 12, 13, 14, 15 |
| Cluster-6 | 16, 17, 18, 19 |
| Cluster-7 | 20, 21, 22, 23 |
| Cluster-8 | 24, 25, 26, 27 |
| Cluster-9 | 28, 29, 30, 31 |
| Cluster-10 | 32, 33, 34, 35 |

9. An apparatus according to claim 8 wherein said plurality of memory elements comprises eleven memory elements and wherein each of said eleven clusters is stored in a corresponding one of said eleven memory elements.

10. An apparatus according to claim 9 wherein each of said eleven memory elements comprises a X4 DRAM memory element.

11. A method for performing error detection and correction within a system on a data word having 36 bits, the data word being stored in eleven multiple bit wide memory elements, the method comprising the steps of:
   a. generating a first set of seven check bits for the data word in accordance with an odd weighted error correction code having seven check bit columns wherein each of said seven check bit columns corresponds to one of said first set of seven check bits, the error correction code having a single code in each of the seven check bit columns;
   b. grouping the 36 bits of the data word and said first set of seven check bits into eleven predetermined clusters;
   c. writing each of said eleven predetermined clusters into a different one of the eleven multiple bit wide memory elements;
   d. reading each of said eleven predetermined clusters from a different one of the eleven multiple bit wide memory elements, thereby reading the data word and the first set of seven check bits;
   e. regenerating a second set of seven check bits for the data word read in reading step (d) in accordance with the error correction code of step (a);
   f. comparing the first set of seven check bits with the second set of seven check bits; and
   g. providing a seven bit syndrome to the system.

12. A method according to claim 11 wherein said data word further comprises an IF bit.

13. A method according to claim 12 wherein said generating step (a) generates said first set of seven check bits (C0–C6) as follows:

| Check bit # | Generation Method |
|---|---|
| C0 | ODD-PARITY (1,2,5,8,12,16–19,23–25,30,35,IF) |
| C1 | ODD-PARITY (0,3,5,9,12–15,19,22,26,28–29,32–35,IF) |
| C2 | ODD-PARITY (0,2,4,6–11,13,18,20–23,26,30,34) |
| C3 | ODD-PARITY (0,3–4,7,10,14,16–19,21,26–28,33) |
| C4 | ODD-PARITY (1–2,4,7,11–15,17,20,24,30–35) |
| C5 | ODD-PARITY (1,3,5–11,15–16,25–27,29–31,33–35) |
| C6 | ODD-PARITY (6–7,20–35,IF) |

14. A method according to claim 13 wherein said regenerating step (e) regenerates said second set of seven check bits (C0–C6) as follows:

| Check bit # | Generation Method |
|---|---|
| C0 | ODD-PARITY (1,2,5,8,12,16–19,23–25,30,35,IF) |
| C1 | ODD-PARITY (0,3,5,9,12–15,19,22,26,28–29,32–35,IF) |
| C2 | ODD-PARITY (0,2,4,6–11,13,18,20–23,26,30,34) |

| Check bit # | Generation Method |
| --- | --- |
| C3 | ODD-PARITY (0,3–4,7,10,14,16–19,21,26–28,33) |
| C4 | ODD-PARITY (1–2,4,7,11–15,17,20,24,30 –35) |
| C5 | ODD-PARITY (1,3,5–11,15–16,25–27,29–31,33–35) |
| C6 | ODD-PARITY (6–7,20–35,IF) |

15. A method according to claim 14 wherein said grouping step (b) groups the 36 bits of the data word and said first set of seven check bits into said eleven predetermined clusters (Cluster-0→Cluster-10) as follows:

| Cluster # | Bit Groupings |
| --- | --- |
| Cluster-0 | C0, C3, 0, 1 |
| Cluster-1 | C1, C4, 2, 3 |
| Cluster-2 | C2, C5, 4, 5 |
| Cluster-3 | C6, IF, 6, 7 |
| Cluster-4 | 8, 9, 10, 11 |
| Cluster-5 | 12, 13, 14, 15 |
| Cluster-6 | 16, 17, 18, 19 |
| Cluster-7 | 20, 21, 22, 23 |
| Cluster-8 | 24, 25, 26, 27 |
| Cluster-9 | 28, 29, 30, 31 |
| Cluster-10 | 32, 33, 34, 35 |

16. A method for performing error detection and correction within a system on a data word having a multiple of three bits, the data word being stored in eleven multiple bit wide memory elements, the method comprising the steps of:
   a. generating a first set of seven check bits for the data word in accordance with an odd weighted error correction code having seven check bit columns wherein each of said seven check bit columns corresponds to one of said first set of seven check bits, the error correction code having a single code in each of the seven check bit columns;
   b. grouping the bits of the data word and said first set of seven check bits into eleven predetermined clusters;
   c. writing each of said eleven predetermined clusters into a different one of the eleven multiple bit wide memory elements;
   d. reading each of said eleven predetermined clusters from a different one of the eleven multiple bit wide memory elements, thereby reading the data word and the first set of seven check bits;
   e. regenerating a second set of seven check bits for the data word read in reading step (d) in accordance with the error correction code of step (a);
   f. comparing the first set of seven check bits with the second set of seven check bits; and
   g. providing a seven bit syndrome to the system.

17. A method for performing error detection and correction within a system on a data word having a multiple of 36 bits, the data word being stored in eleven multiple bit wide memory elements, the method comprising the steps of:
   a. generating a first set of seven check bits for the data word in accordance with an odd weighted error correction code having seven check bit columns wherein each of said seven check bit columns corresponds to one of said first set of seven check bits, the error correction code having a single code in each of the seven check bit columns;
   b. grouping the bits of the data word and said first set of seven check bits into eleven predetermined clusters;
   c. writing each of said eleven predetermined clusters into a different one of the eleven multiple bit wide memory elements;
   d. reading each of said eleven predetermined clusters from a different one of the eleven multiple bit wide memory elements, thereby reading the data word and the first set of seven check bits;
   e. regenerating a second set of seven check bits for the data word read in reading step (d) in accordance with the error correction code of step (a);
   f. comparing the first set of seven check bits with the second set of seven check bits; and
   g. providing a seven bit syndrome to the system.

* * * * *